United States Patent [19]

Bulanda

[11] 4,029,277

[45] June 14, 1977

[54] APPARATUS FOR HOLDING AND FORMING A PLURALITY OF OBJECTS INTO A BUNDLE

[75] Inventor: John J. Bulanda, New Lenox, Ill.

[73] Assignee: Panduit Corporation, Tinley Park, Ill.

[22] Filed: Mar. 15, 1976

[21] Appl. No.: 666,548

[52] U.S. Cl. .......................... 248/74 R; 24/132 R; 24/262 R; 269/131
[51] Int. Cl.² ................. F16G 11/00; A44B 21/00
[58] Field of Search .......... 248/74 R, 74 PB, 74 A, 248/74 B, 68 R, 68 CB; 269/131; 24/262 R, 254, 132 R, 257 R; 81/57, 17

[56] References Cited

UNITED STATES PATENTS

| 3,627,300 | 12/1971 | Caveney | 248/68 R X |
| 3,883,929 | 5/1975 | Fortsch | 269/131 X |
| 3,916,089 | 10/1975 | Sloan | 248/74 A X |
| 3,944,177 | 3/1976 | Yoda | 248/74 A |

FOREIGN PATENTS OR APPLICATIONS 827,505 2/1960 United Kingdom ............. 248/74 A Primary Examiner—J. Franklin Foss
Attorney, Agent, or Firm—Charles R. Wentzel; Richard B. Wakely

[57] ABSTRACT

Apparatus for forming a plurality of elongate objects such as wires into a bundle of circular cross section. The apparatus comprises a base adapted to be securely affixed to a mount such as a panelboard and a frame for mounting on the base. The frame comprises a pair of arms extending upwardly from adjacent the base with each arm terminating in an end portion. The end portions are movable relative to one another between a retaining position wherein the spacing between the end portions is less than the diameter of one of the objects and a release position wherein the spacing is at least as great as the object diameter. In their release portion, the end portions define an object-receiving opening. The arms are biased toward their retaining position. The apparatus further comprises a length of elastomeric material removably carried by the frame and free of the base. The length includes a portion bridging the arms adjacent the free ends. This portion cooperates with the end portions to hold the bundle therebetween. The frame and the base comprise attachment means for releasably mounting the frame on the base and operable to remove the frame therefrom whereby upon damage to the length of elastomeric material, it can be removed from the base without removal of the base from the support.

20 Claims, 11 Drawing Figures

APPARATUS FOR HOLDING AND FORMING A PLURALITY OF OBJECTS INTO A BUNDLE

BACKGROUND OF THE INVENTION

The present invention relates to holders for wire harnesses and more particularly to such a holder including a length of elastomeric material which supports the wires as they are added to the holder and forms the wires into a bundle of generally circular cross section.

It is common practice in the fabrication of a wire harness to mount a plurality of wire holders on a jig or panelboard along the intended route of the harness. The wires are placed in the various holders as they are run individually between their desired termination points. After completion of the wiring, cable ties or the like are applied to permanently hold the wires in their bundled configuration. It is highly desirable for the wire holders to form the wires into a bundle of circular configuration since a circle offers the smallest periphery for a given enclosed area. If a cable tie was applied adjacent a wire holder which held the bundle in another configuration, after removal from the work holder the bundled wires would be free to assume a circular grouping causing the cable tie to become unacceptably loose.

Commercially available prior art wire retainers which function to form the wires into a circular grouping typically include a base adapted for secure attachment to the panelboard by means of screws or the like, a pair of arms pivotally mounted on the base, and a length of elastomeric material spanning the free ends of the arms and cooperating therewith to form the wires into a generally circular grouping. The weakest component of such retainers is, of course, the elastomeric material which could inadvertently be damaged through contact with a sharp tool or which could lose its resiliency with repeated use thus requiring replacement.

A common shortcoming of the commercially available prior art structures is that the elastomeric material cannot be readily replaced. More specifically, the material is either inaccessible for removal or it is formed into a loop and held by a part of the base thus requiring the time-consuming step of removal of the base from the panelboard before the looped material can be removed and replaced.

In other types of prior art wire retainers, the ends of the elastomeric material are pinned or rivetted to the base with the pin or rivet head disposed very close to the base thus making the replacement of the material difficult if it is at all possible. A further disadvantage of such structures is that the ends of the material are at least partially exposed thereby making them susceptible to accidental separation from their anchoring means.

Another type of wire retainer has been proposed including a unitary molded arm-base structure. A problem attendant to such a molded structure is that if the resilient spring arms are molded thin enough to permit low force insertion of a wire, they have insufficient strength to overcome the resiliency of the elastomeric material which has a propensity to eject a wire previously inserted between the spring arms.

Reference may be made to U.S. Pat. Nos. 3,627,300 and 3,883,929.

SUMMARY OF THE INVENTION

Among the several objects and features of the present invention may be noted the provision of improved apparatus for forming a plurality of wires into a bundle of generally circular cross section; the provision of such apparatus which permits fast and convenient replacement of a damaged or worn out length of elastomeric material; the provision of such apparatus which places the spring arms in a preload condition to give them sufficient strength and resiliency to overcome the resiliency of the elastomeric material so that a wire previously inserted between the arms will not be ejected from the apparatus due to the action of the elastomeric material; the provision of such apparatus which permits relatively low force insertion of one or more wires between the arms; the provision of such apparatus which encloses the ends of the length of elastomeric material to prevent the assembler from inadvertently removing an end from its anchoring means; and the provision of such apparatus which is reliable in use, has long service life, and is simple and economical to manufacture. Other objects and features of the present invention will be in part apparent and in part pointed out hereinafter in the specification and in the claims annexed thereto.

Briefly, the apparatus of the present invention includes a base, a frame, and a length of elastomeric material removably carried by the frame and free of the base. The base is adapted to be securely affixed to a mount such as a panelboard. The frame includes a pair of arms extending upwardly forming adjacent the base with each arm terminating in an end portion. The end portions are movable relative to one another between a retaining position wherein the spacing between the end portions is less than the diameter of one of the objects and a release position wherein the spacing is at least as great as the object diameter. The length of elastomeric material includes a portion bridging the arms adjacent their free ends and this portion cooperates with the end portions to hold the bundle therebetween. The frame and the base include attachment means for releasably mounting the frame on the base. The attachment means is operable to remove the frame from the base so that if the length of elastomeric material is damaged, it can be removed from the base without removal of the base from the support.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
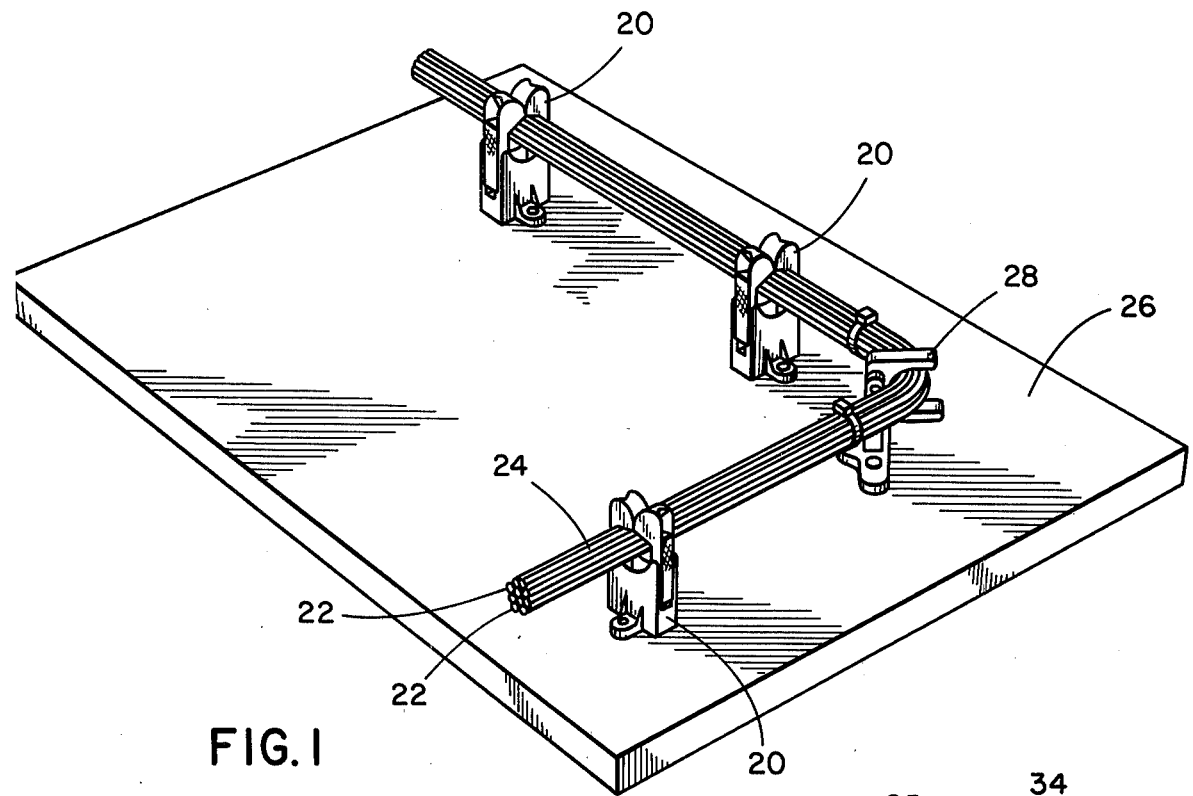
FIG. 1 is a perspective view of a wiring board including bundle forming apparatus of the present invention.

Referring now to FIG. 1, apparatus for holding and forming a plurality of elongate objects such as wires 22 into a bundle 24 of generally circular cross section is generally indicated by reference numeral 20. Holding and forming apparatus 20 is preferably mounted on a panelboard 26 or the like and may be used in conjunction with a corner post 28 which forms and supports a turn in the bundle. An example of such a corner post is fully disclosed in commonly-assigned U.S. patent application Ser. No. 613,383 filed Sept. 15, 1975.

Figure 4:
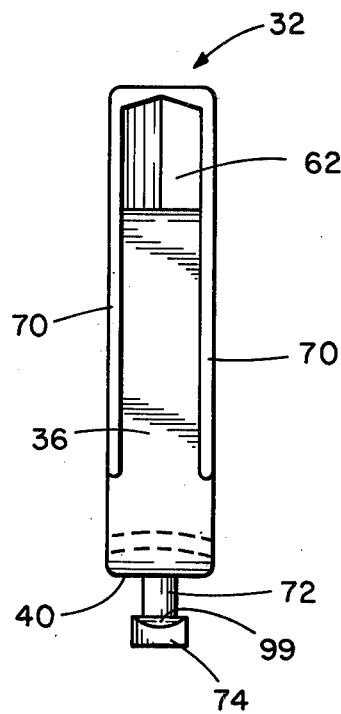
Figure 5:
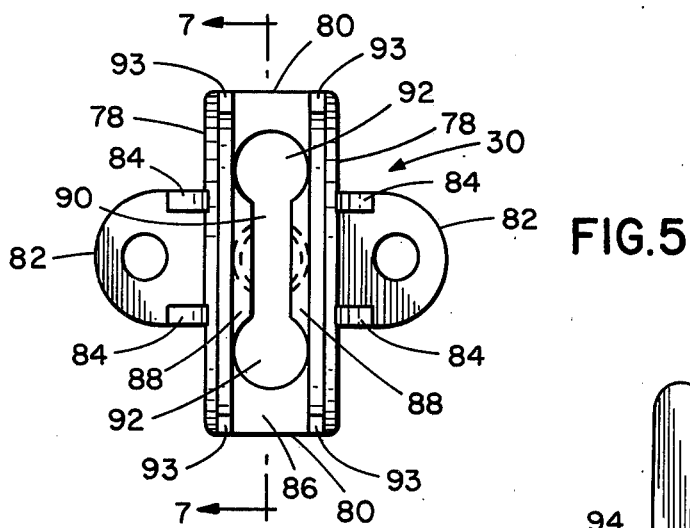
FIGS. 5 and 6 are, respectively, a plan and a side elevational view of the base.
Figure 6:
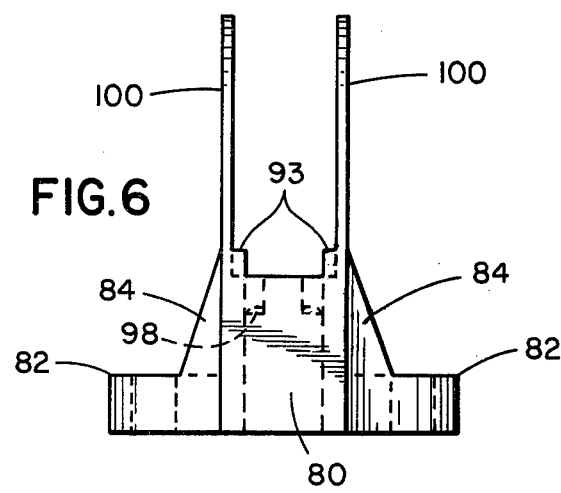
Figure 7:
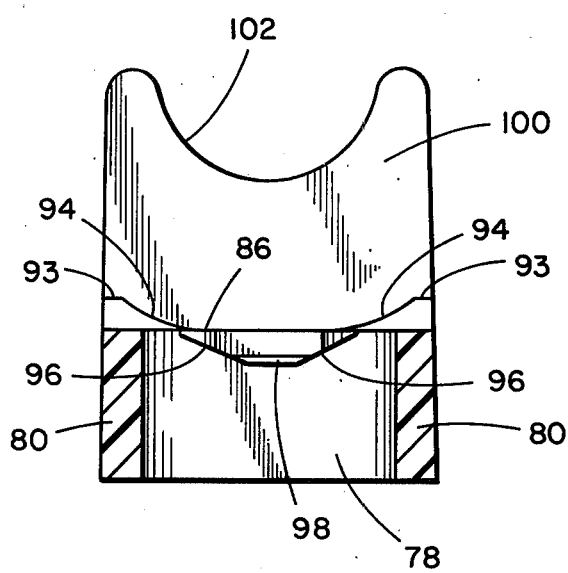
FIG. 7 is a sectional view of the base taken generally along line 7—7 of FIG. 5.

Bundle forming apparatus 20 includes a base 30 (best shown in FIGS. 5–7), adapted to be permanently secured to panelboard 26, a frame 32 (see FIGS. 3 and 4) for mounting on base 30, and a length of elastomeric material 34 removably carried by the frame and coacting therewith to form wires 22 into bundle 24. As will appear more fully hereinafter, the length of elastomeric material is removably held only by the frame and is free of the base. That is, while material 34 may engage base 30 when frame is mounted therein, no additional steps are required to remove both the material and the frame from the base than are required to remove the frame from the base if material 34 was not present. Thus, dismounting of frame 32 results in removal of material 34 from engagement with base 30.

Figure 2:
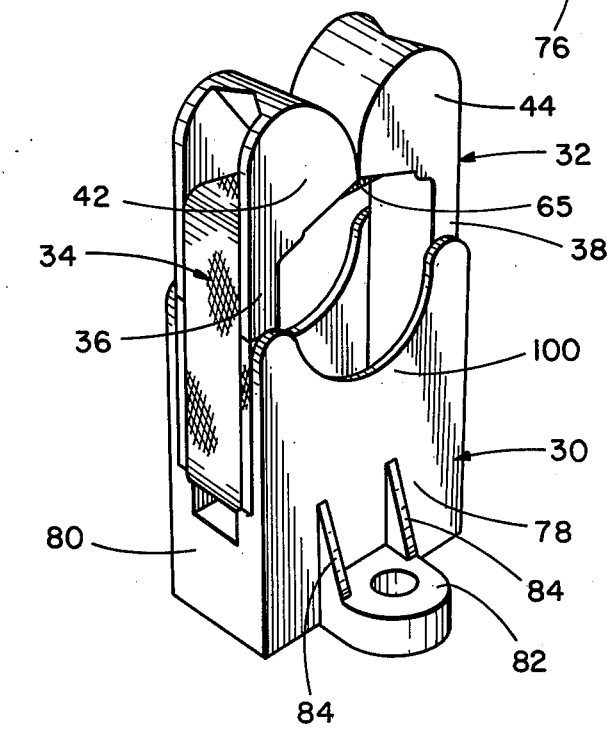
FIG. 2 is a perspective view of the bundle forming apparatus which includes a base, a frame, and a length of elastomeric material held by the frame.
Figure 10:
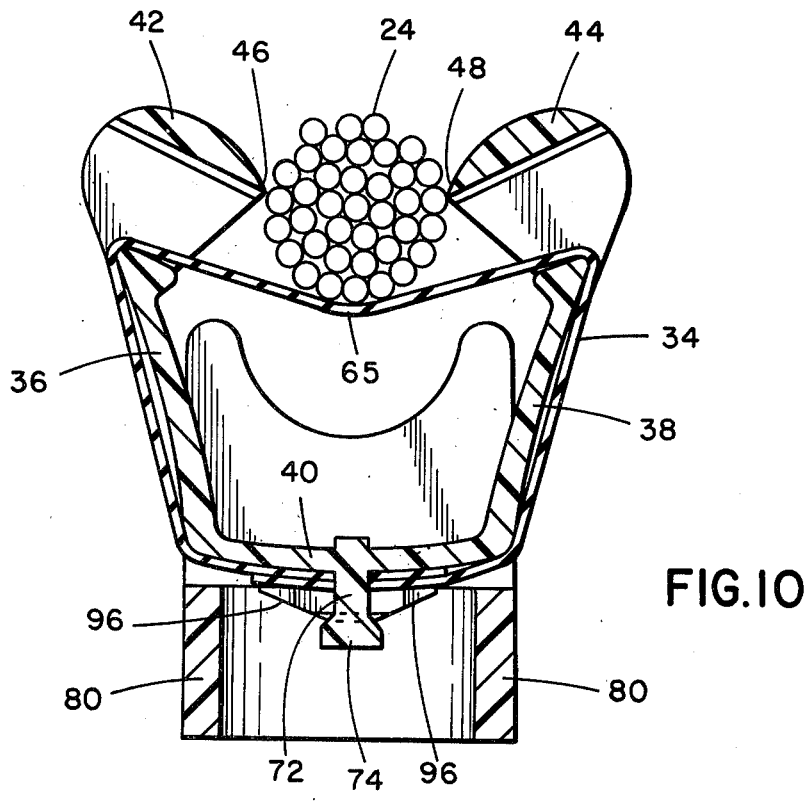
FIG. 10 shows the completed bundle as it is removed from the bundle forming apparatus of the present invention.

More specifically, frame 32 is preferably of unitary molded plastic construction and comprises a pair of generally parallel spring arms 36, 38 shown in FIG. 2 extending upwardly from adjacent base 30 and joined at their lower ends by a resilient transverse support 40. Each arm 36, 38 includes a generally horizontal, inwardly extending cantilever 42, 44 respectively, terminating in a respective distal end portion 46, 48. End portions 46, 48 form a throat 50 to a wire-receiving cavity 52 partially defined by arms 36, 38 and the end portions are movable relative to one another between a retaining position, shown in FIGS. 1 and 2, wherein the spacing therebetween is less than the diameter of one of the objects to be held and a release or open position, for example as shown in FIG. 10, wherein the spacing between the end portions is at least as great as the diameter of a held object. As will appear more fully hereinafter, end portions 46, 48 are biased to their retaining position.

Cantilevers 42, 44 comprise respective upper cam surfaces 54, 56 sloping inwardly and downwardly toward throat 50 so that one or more wires 22 positioned on the surfaces above throat 50 when pushed downwardly will cause end portions 46, 48 to spread to their open or release position thereby permitting entrance of the wires into cavity 52. The cantilevers similarly include respective lower cam surfaces 58, 60 extending upwardly and inwardly toward throat 50 and the lower cam surfaces function in a manner similar to that of the upper cam surfaces to allow release of a completed bundle 24 from frame 32.

Each cantilever includes a respective aperture 62, 64 for receiving the length of elastomeric material 34 so that a portion 65 thereof spans and underlies end portions 46, 48 to serve as a cradle for wires inserted into cavity 52. Arms 36, 38 include respective surfaces 66, 68 adjacent the respective apertures for supporting portion 65 and the arms further include spaced, outwardly extending side rails 70 defining channels for receiving and protecting material 34 adjacent thereto.

Figure 11:
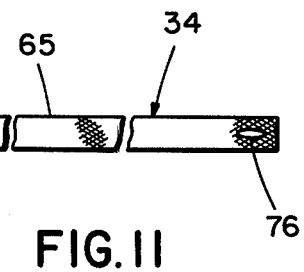
FIG. 11 is a plan of the length of elastomeric material of the present invention.

Frame 32 comprises means for anchoring material 34 in the form of a dependent anchor pin 72 extending from support 40 and terminating in an enlarged head 74. As shown in FIG. 11, each end portion of the length of elastomeric material 34 includes a closed ended slit 76 for receiving the shank of pin 72 to enable the material to be formed into a loop encompassing arms 36, 38 and support 40. It should be appreciated that material 34 is anchored remote from spanning portion 65 and due to the frictional engagement of material 34 with arms 36, 38 there is little or no stretching of the material adjacent the anchoring means when wires are added to the frame and thus there is no requirement to reinforce the material near the ends of slits 76.

Mounting base 30 includes side walls 78, end walls 80, and apertured lateral mounting feet 82 for reception of a mounting screw or the like. Each foot 82 is joined to a respective wall 78 by at least one reinforcing rib 84. Base 30 and frame 32 comprise attachment means for releasably mounting the frame on the base and which is operable to remove the frame from the base. More specifically, the attachment means comprises the enlarged head 74 of anchor pin 72 and a top wall 86 of base 30. Top wall 86 includes an elongate aperture and a pair of transverse ledges 88 extending oppositely into the aperture to divide the aperture into a central portion 90 of greater width than the shank of pin 72 but of smaller width than enlarged head 74, and enlarged end portions 92 sufficiently large to receive head 74.

Figure 3:
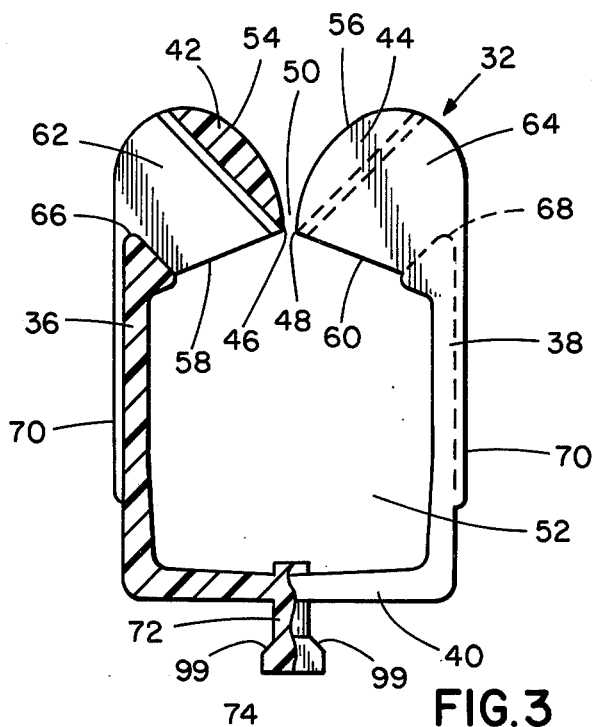
FIGS. 3 and 4 are, respectively, front and side elevational views of the frame of FIG. 2 with certain parts of the frame removed.
Figure 8:
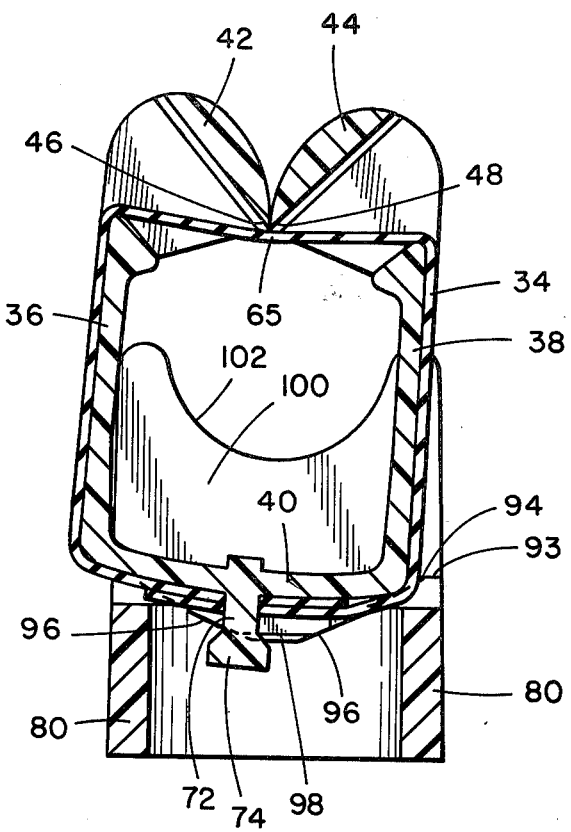
FIG. 8 shows the frame holding the length of elastomeric material as the frame is installed on the base.

As shown in FIG. 3, in the as-molded condition of frame 32 the end portions 46, 48 of the cantilevers are spaced. The attachment means of base 30 comprises means for preloading frame 32 and, more specifically, transverse support 40 so that end portions 46, 48 are contiguous or at least the spacing therebetween is less when the frame is mounted on the base than in the as-molded condition of the frame. It should be noted that it is difficult to mold parts having components in a preloaded condition, that is, components which are contiguous after the part has been removed from the mold but which components can be separated during use of the part. If the frame was not preloaded, the elastic band might eject a wire previously inserted into cavity 52 as the spring constant of arms 36, 38 must be sufficiently low to permit relatively low force insertion of the wires 22 into cavity 52. The preloading means comprises shoulders 93 disposed above top wall 86 adjacent each end thereof for supporting transverse support 40 and further comprises respective ramps 94 extending from the top wall 86 to the respective shoulders 93. Similarly, the undersurfaces of ledges 88 define downwardly and inwardly sloping ramps 96 for guiding enlarged head 74 into a well 98. Accordingly, frame 32 is mounted by positioning pin head 74 in one of the enlarged aperture end portions 92, as shown in FIG. 8, and pushing the frame generally horizontally until pin head 74 is received by well 98. As the frame is so moved, ramps 94 lift the leading end of support 40 while ramps 96 cause the central portion of support 40 to be lowered thus effecting a bowing of the support and a preloading of arms 36, 38. While the structure heretofore described permits mounting of the frame from either end of the base, it will be understood that shoulders 93 could be provided adjacent only one end of top wall 86 and only one aperture end portion 92 used, of course, with aperture central portion 90 disposed therebetween. Anchor pin 72 has upwardly and inwardly inclined cam surfaces 99 joining its shank and head 74 to facilitate release of the head 74 from well 98 upon application of a predetermined horizontal force adjacent the lower end of either arm 36 or 38.

Each side wall 78 includes a shield 100 extending upwardly enclosing the ends of the length of elastomeric material to prevent their inadvertent removal from pin 72. Shields 100 include concave abutment surfaces 102 for limiting the size of the bundle held by bundle forming apparatus 20.

Figure 9:
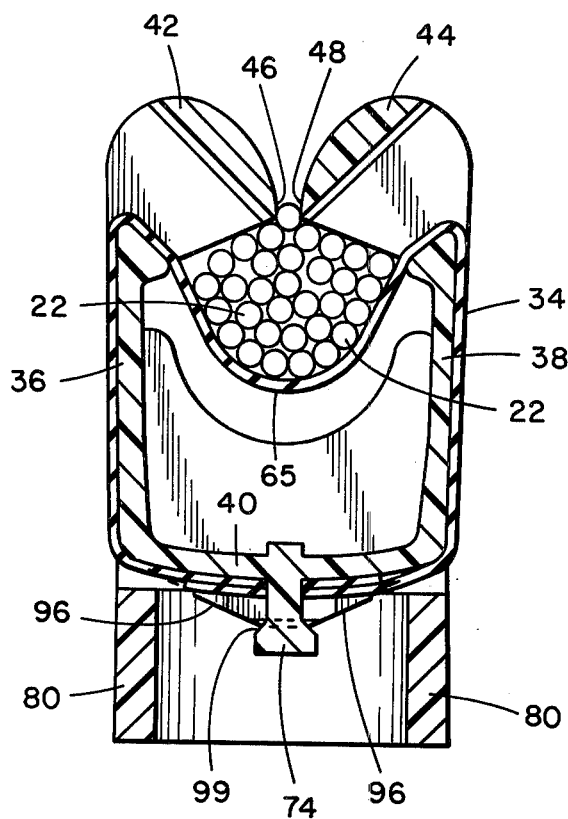
FIG. 9 shows a wire as it is added to a partially completed bundle supported by the length of elastomeric material.

Operation of bundle forming apparatus 20 of the present invention is as follows: With base 30 affixed to panelboard 26 and elastomeric material 34 held by frame 32 so that portion 65 of the material underlies and spans cantilever ends 46, 48, the frame can readily be mounted, as shown in FIG. 8, by positioning pin head 74 in on of the enlarged aperture end portions 92 and moving the frame generally horizontally until head 74 is received by well 98. As previously described, this causes preloading of the frame resulting in the engagement of cantilever end portions 46, 48. Bundle 24 is formed by placing wires 22 on upper cam surfaces 54, 56 and pushing them downwardly causing end portions 46, 48 (biased by spring arms 36, 38 to their retaining position) to move toward their open or release position defining throat 50 and admitting the wires to cavity 52 as shown in FIG. 9. Once within the cavity, the partially formed bundle is supported beneath its horizontal axis by elastomeric material portion 65 and engaged above its horizontal axis by cantilevers 42, 44. With the entrance of additional wires to the cavity, portion 65 due to its support by arm surfaces 66, 68 becomes increasingly arcuate and coacts with lower cantilever cam surfaces 58, 60 to form the wires into a bundle of generally circular cross section. After completion of bundle 24, cable ties or the like can conveniently be applied adjacent bundle forming apparatus 20 to maintain the generally circular cross-sectional configuration of the bundle. The bundle is removed from apparatus 20 by simply pulling the bundle upwardly which, due to the action of lower cam surfaces 58, 60, causes end portions 46, 48 to move toward their release positions. Upon damage or wearing out of material 34, the frame holding material 34 can easily be removed from base 30 by simply applying a horizontal force adjacent the lower end of one of the arms 36, 38.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. Apparatus for forming a plurality of elongate objects such as wires into a bundle of circular cross section, said apparatus comprising:

a base adapted to be securely affixed to a mount such as a panelboard;

a frame for mounting on said base comprising a pair of arms extending generally upwardly from adjacent said base, each arm terminating in an end portion, said end portions being movable relative to one another between a retaining position wherein the spacing between said end portions is less than the diameter of one of said objects and a release position wherein the spacing is at least as great as the object diameter wherein said end portions define an object-receiving opening, said arms being biased toward their retaining position;

and a length of elastomeric material removably carried by said frame and free of said base, said length including a portion bridging said arms adjacent said free ends, said portion cooperating with said end portions to hold said bundle therebetween, said frame and said base comprising attachment means for releasably mounting said frame on said base and operable to remove said frame therefrom whereby upon damage to said length of elastomeric material, it can be removed from said base without removal of said base from said support.

2. Apparatus as set forth in claim 1 wherein said frame is of one-piece thermoplastic construction.

3. Apparatus as set forth in claim 1 wherein said frame further comprises a transverse support joining said arms adjacent their lower ends, said arms and said support defining an object-receiving cavity.

4. Apparatus as set forth in claim 3 wherein said arms are spring arms and extend generally vertically from said support, each arm including a generally horizontal, inwardly extending cantilever adjacent its upper end, the distal ends of said cantilevers constituting said end portions of said arms.

5. Apparatus as set forth in claim 4 wherein each cantilever comprises an upper cam surface sloping inwardly and downwardly toward its distal end whereby an object pushed downwardly between said cantilevers causes said arms to move toward their release position.

6. Apparatus as set forth in claim 4 wherein each cantilever comprises a lower cam surface sloping upwardly and inwardly toward its distal end whereby said bundle upon being pulled upwardly between said cantilevers causes said arms to move toward their release position.

7. Apparatus as set forth in claim 4 wherein each cantilever has an aperture for receiving said portion of said length of elastomeric material so that said portion is disposed below said distal ends and wherein each arm comprises a support surface adjacent its cantilever aperture for supporting said portion.

8. Apparatus as set forth in claim 3 wherein said frame comprises anchoring means for holding the end portions of said length of elastomeric material thereby to form said length into a loop encircling said support and portions of each arm.

9. Apparatus as set forth in claim 3 wherein said frame is of molded one-piece thermoplastic construction and wherein said transverse support is resilient.

10. Apparatus as set forth in claim 9 wherein in the as-molded condition of said frame the end portions of said arms are spaced and wherein said attachment means comprises means for preloading said transverse support so that said end portions of said arms are closer to one another when said frame is mounted on said base than in the as-molded condition of said frame.

11. Apparatus as set forth in claim 1 wherein said base comprises a pair of spaced side walls and said attachment means comprises a top wall joining said side walls, said top wall having an elongate aperture and further having a ledge extending into said aperture to divide said aperture into a narrow portion and an enlarged portion.

12. Apparatus as set forth in claim 11 wherein said frame comprises a transverse support joining said arms, said attachment means comprising an anchor pin extending downwardly from said support intermediate said arms and having an enlarged head portion.

13. Apparatus as set forth in claim 12 wherein said attachment means further comprises shoulder means disposed above said top wall adjacent one end thereof for supporting said transverse support, said narrow portion of said aperture being disposed intermediate said enlarged portion and said shoulder means.

14. Apparatus as set forth in claim 13 wherein said attachment means comprises first ramp means extending from said top wall to said shoulder means whereby after insertion of said anchor pin in the enlarged portion of said aperture, lateral movement of said frame towards said shoulder means causes an end of said transverse support to be lifted while the head portion of said pin is held from upward movement by said ledge thereby placing said transverse support in a preloaded condition.

15. Apparatus as set forth in claim 14 wherein said ledge comprises second ramp means for lowering an intermediate portion of said transverse support as said end thereof is being lifted.

16. Apparatus as set forth in claim 12 wherein each end portion of said length of elastomeric material includes a closed ended slit for receiving said anchor pin, said length being formed into a loop encompassing said transverse support and portions of each of said arms.

17. Apparatus as set forth in claim 16 wherein each of said side walls extends above said top wall to enclose the end portions of said length of elastomeric material.

18. Apparatus as set forth in claim 17 wherein one of said side walls terminates is an arcuate abutment surface for limiting the size of the bundle held by said apparatus.

19. Apparatus for forming a plurality of elongate objects such as wires into a bundle having a generally circular cross section, said apparatus comprising:
a base adapted to be attached to a support such as a panelboard;
a frame comprising a pair of generally vertical spring arms joined by a transverse support adjacent their lower ends, each arm having a generally horizontal, inwardly extending cantilever adjacent its upper end, said respective cantilevers terminating in respective distal ends relatively movable between a first position wherein the spacing between said arms is less than the diameter of one of said objects and a second position wherein said spacing is at least as great as the diameter of one of said objects and wherein said ends form an object-receiving opening;
and a length of elastomeric material removably carried by said frame and free of said base, said length including a portion supported by each arm adjacent its upper end, bridging said arms, and disposed beneath at least a part of said distal ends, said portion cooperating with said cantilevers to hold said bundle therebetween, said frame and said base comprising attachment means for releasably mounting said frame on said base and operable to remove said frame therefrom whereby if said length of elastomeric material wears out or is damaged, it can be conveniently and quickly removed from said base without removal of said base from said support.

20. The combination of a holder and a bundle of wires having a generally circular cross section, said holder comprising:
a base adapted to be affixed to a support such as a panelboard;
a frame detachably mounted on said base including a pair of arms defining a wire-receiving opening and movable relative to one another between a wire-retaining position and a wire-receiving position; and
a length of elastomeric material removably carried by said frame and free of said base, said length including a portion bridging said arms and supporting said bundle beneath the horizontal axis of said bundle, said arms engaging said bundle above the horizontal axis thereof, one of said frame and said length of elastomeric material comprising means for biasing said arms to their wire-retaining position, said frame and said base comprising attachment means for releasably mounting said frame on said base and operable to remove said frame therefrom whereby if said length of elastomeric material wears out or is damaged, it can be conveniently and quickly removed from said base without removal of said base from said support.

* * * * *